United States Patent
Matsushita et al.

(10) Patent No.: US 7,080,176 B2
(45) Date of Patent: Jul. 18, 2006

(54) BUS CONTROL DEVICE AND INFORMATION PROCESSING SYSTEM

(75) Inventors: Kenji Matsushita, Higashiosaka (JP); Tetsu Fukue, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 285 days.

(21) Appl. No.: 10/687,128

(22) Filed: Oct. 15, 2003

(65) Prior Publication Data

US 2004/0128424 A1 Jul. 1, 2004

(30) Foreign Application Priority Data

Dec. 11, 2002 (JP) .............................. 2002-359980

(51) Int. Cl.
*G06F 13/368* (2006.01)
*H04L 12/40* (2006.01)

(52) U.S. Cl. ...................... 710/123; 710/309; 710/244; 711/151

(58) Field of Classification Search ................ 710/107, 710/120; 345/535
See application file for complete search history.

(56) References Cited

U.S. PATENT DOCUMENTS 6,333,745 B1 * 12/2001 Shimomura et al. ........ 345/535
6,519,666 B1 * 2/2003 Azevedo et al. ............ 710/120
6,636,913 B1 * 10/2003 Batchelor et al. ........... 710/107

FOREIGN PATENT DOCUMENTS

JP 63-181068 7/1988
JP 7-334455 12/1995

* cited by examiner

*Primary Examiner*—Christopher E. Lee
(74) *Attorney, Agent, or Firm*—Hamre, Schumann, Mueller & Larson, P.C.

(57) ABSTRACT

In a bus control device including an external interface, internal units, a memory interface, and an internal bus, the memory interface monitors the usage pattern of the internal bus, and in a case where the internal unit is not using the internal bus, a priority processing interval for allowing only the external interface to use the internal bus is set, thereby prohibiting the internal units from using the internal bus during the priority processing interval.

10 Claims, 13 Drawing Sheets

BUS CONTROL DEVICE AND INFORMATION PROCESSING SYSTEM

BACKGROUND OF THE INVENTION

1. Field of the Invention

The present invention relates to a bus control device at least provided with an internal bus and an internal unit, and an information processing system using the bus control device. In particular, the present invention relates to a bus control device that mediates between a CPU and a local memory to control the use of an internal bus by the CPU and an internal unit, and an information processing system using the bus control device.

2. Description of the Related Art

A conventional bus control device will be described with reference to FIG. 13. FIG. 13 shows an exemplary configuration of a conventional bus control device. As shown in FIG. 13, a bus control device 91 includes an internal bus 96, an external interface 92, a memory interface 94, and a plurality of internal units 93. The external interface 92, the memory interface 94, and a plurality of internal units 93 are connected to the internal bus 96.

The memory interface 94 is provided with a bus arbiter 95 for arbitrating in the use of the internal bus 96. The external interface 92 is connected to an external CPU (central processing unit) 100 via a system bus 101. The memory interface 94 is connected directly to an external local memory 102.

In the case where the CPU 100 accesses the local memory 102, the CPU 100 first accesses the external interface 92. When accessed from the CPU 100, the external interface 92 requests the use of the internal bus 96 with respect to the bus arbiter 95. In the case where none of a plurality of internal units 93 uses the internal bus 96, the bus arbiter 95 permits the external interface 92 to use the internal bus 96.

When the external interface 92 is permitted to use the internal bus 96, the external interface 92 transfers data with respect to the local memory 102 via the memory interface 94 on the internal bus 96 side, and the external interface 92 transfers data with respect to the CPU 100 on the system bus 101 side.

In FIG. 13, reference numeral 97a denotes a bus request signal for the internal unit 93 to request the use of the internal bus 96 with respect to the bus arbiter 95, and reference numeral 97b denotes a bus request signal for the external interface 92 to request the use of the internal bus 96 with respect to the bus arbiter 95. Reference numeral 98a denotes a bus permission signal for the bus arbiter 95 to permit the internal unit 93 to use the internal bus 96. Reference numeral 98b denotes a bus permission signal for the bus arbiter 95 to permit the external interface 92 to use the internal bus 96.

Assume that the external interface 92 requests the use of the internal bus 96 with respect to the bus arbiter 95, and either one of the internal units 93 has been using the internal bus 96 continuously for a long period of time, and transferring data with respect to the local memory 102 via the memory interface 94.

In this case, the bus arbiter 95 cannot permit the CPU 100 to use the internal bus 96. Therefore, the external interface 92 outputs a stand-by signal to the CPU 100. When, the stand-by signal is output, the CPU 100 is put in a stand-by state, and continues to wait for a response from the external interface 92. Furthermore, the CPU 100 in a stand-by state cannot access another device connected via the system bus 101. Therefore, when the stand-by period of the CPU 100 is prolonged, the performance of the entire system may be degraded.

In order to solve the above-mentioned problem, a system is proposed in which a plurality of shared memories shared by a plurality of devices are provided (e.g., see JP 63(1988)-181068 A). If such a system is used, a plurality of devices can write/read data simultaneously. This can suppress degradation of the performance of the entire due to a prolonged stand-by period.

However, in the above-mentioned system, a plurality of shared memories are required for constituting one system, which increases a cost.

SUMMARY OF THE INVENTION

Therefore, with the foregoing in mind, it is an object of the present invention to provide a bus control device capable of enhancing the performance of an entire system by dispensing with a plurality of shared memories to shorten the stand-by period of access between a local memory and an external device such as a CPU, and an information processing system using the bus control device.

In order to achieve the above-mentioned object, a first bus control device according to the present invention includes an external interface connected to an external device via an external system bus, an internal unit, a memory interface connected to an external local memory, and an internal bus at least connecting the external interface to the memory interface and connecting the internal unit to the memory interface. The memory interface monitors a usage pattern of the internal bus by the external interface and the internal unit, and sets a priority processing interval that allows only the external interface to use the internal bus in a case where the internal unit is not using the internal bus, thereby prohibiting the internal unit from using the internal bus during the priority processing interval.

In the above-mentioned first bus control device, it is preferable that the memory interface includes a bus arbiter for arbitrating between a request for use of the internal bus by the external interface and by the internal unit, and a priority processing interval managing part for monitoring the usage pattern of the internal bus based on a result of an arbitration performed by the bus arbiter. It also is preferable that the priority processing interval managing part notifies the bus arbiter and the external interface that only the external interface is permitted to use the internal bus, in a case where the internal unit is not using the internal bus, and sets the priority processing interval, and the bus arbiter prohibits the internal unit from using the internal bus while the priority processing interval is set.

Furthermore, in the above-mentioned aspect of the first bus control device, it is preferable that the memory interface includes a priority processing interval setting register for storing information specifying a length of the priority processing interval, and the priority processing interval managing part sets the priority processing interval based on the information stored in the priority processing interval setting register.

Furthermore, in the above-mentioned aspect of the first bus control device, it is preferable that the internal unit has a function of notifying the bus arbiter of an amount of data to be transferred, as well as requesting a use of the internal bus. It also is preferable that the bus arbiter compares a previously set amount of data with the amount of data to be transferred, in a case of receiving a request for use of the internal bus from the internal unit and a notification of the amount of data to be transferred, during the priority processing interval, and when the amount of data to be transferred is equal to or less than the previously set amount of data, the bus arbiter permits the internal unit to use the internal bus during the priority processing interval.

Furthermore, in the above-mentioned aspect of the first bus control device, it is preferable that the priority processing interval managing part monitors the usage pattern of the internal bus by confirming the result of the arbitration performed by the bus arbiter at a previously set frequency, and the frequency is set by the external device.

In order to achieve the above-mentioned object, a second bus control device according to the present invention includes an external interface connected to an external device via an external system bus, a plurality of internal units, a memory interface connected to an external local memory, and an internal bus connecting the external interface to the memory interface and connecting the internal units to the memory interface. A part of the plurality of internal units has a function of dividing data to be transferred to the memory interface via the internal bus and transferring it, and the memory interface prohibits the internal units other than the part of the plurality of internal units from using the internal bus and permits the external interface to use the internal bus, during a period before transfer of all the divided data is completed.

In the above-mentioned second bus control device, it is preferable that the part of the internal units has a division and transfer notifying part, the division and transfer notifying part has a function of notifying the memory interface that the divided data is being transferred, during a period before the transfer of all the divided data is completed, in a case of transferring the data after dividing it. The memory interface has a bus arbiter for arbitrating in a request for use of the internal bus by the external interface and the internal units, and the bus arbiter prohibits the other internal units from using the internal bus and permits the external interface to use the internal bus, while being notified that the divided data is being transferred.

In the above-mentioned aspect of the second bus control device, it is preferable that the part of the internal units includes a division number setting register for storing information specifying a division number of the data, and divides the data based on the stored information.

Furthermore, in the above-mentioned aspect of the second bus control device, it is preferable that the external interface and the other internal units have a function of requesting a use of the internal bus with respect to the bus arbiter and notifying the bus arbiter of an amount of data to be transferred. It also is preferable that the bus arbiter compares a previously set amount of data with the amount of data to be transferred, in a case of receiving a request for use of the internal bus and a notification of the amount of data to be transferred from one or both of the external interface and the other internal units, while being notified that the divided data is being transferred, thereby determining whether or not one or both of the external interface and the other internal units are intended to transfer an amount of data equal to or less than the previously set amount of data, and the bus arbiter permits the use of the internal bus with respect to those which are determined to be intended to transfer the amount of data equal to or less than the previously set amount of data, while being notified that the divided data is being transferred.

In order to achieve the above-mentioned object, an information processing system according to the present invention includes either the above-mentioned first or second bus control device, a CPU connected to the external interface of the bus control device via a system bus, and a local memory connected to the memory interface of the bus control device.

These and other advantages of the present invention will become apparent to those skilled in the art upon reading and understanding the following detailed description with reference to the accompanying figures.

DESCRIPTION OF THE PREFERRED EMBODIMENTS

EMBODIMENT 1

Figure 1:
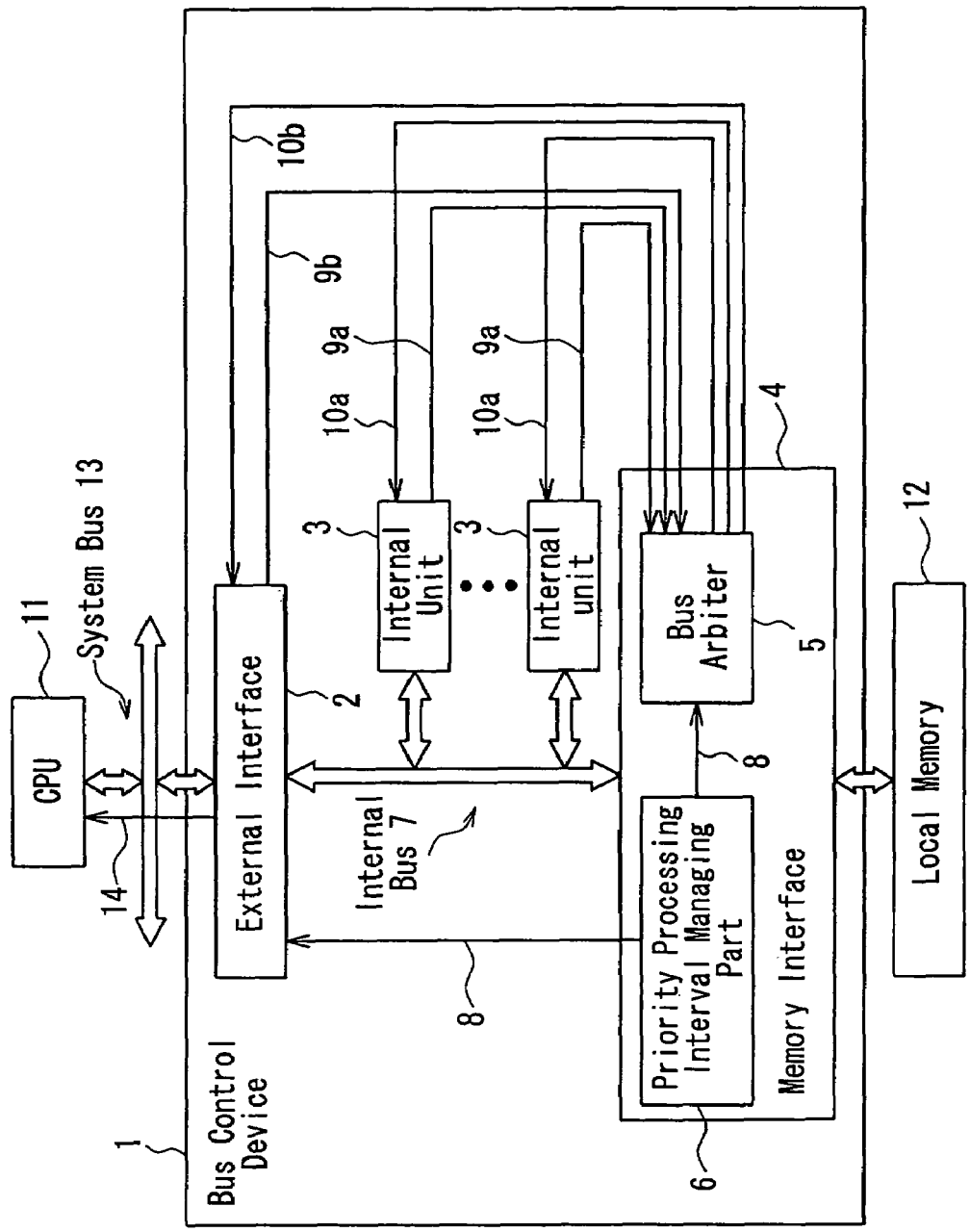
FIG. 1 is a view showing configurations of a bus control device and an information processing system according to Embodiment 1 of the present invention.

Hereinafter, a bus control device and an information processing system according to Embodiment 1 of the present invention will be described with reference to FIGS. 1 and 2. First, the configurations of the bus control device and the information processing system according to Embodiment 1 will be described with reference to FIG. 1. FIG. 1 shows the configurations of the bus control device and the information processing system according to Embodiment 1 of the present invention.

As shown in FIG. 1, a bus control device 1 of Embodiment 1 includes an external interface 2, internal units 3, a memory interface 4, and an internal bus 7. Furthermore, the information processing system according to Embodiment 1 has a configuration in which the external interface 2 of the bus control device 1 is connected to a CPU 11 that is an external device via an external system bus 13, and the memory interface 4 is connected directly to an external local memory 12.

The internal bus 7 connects the external interface 2 and the memory interface 4 to each other, and connects each internal unit 3 and the memory interface 4 to each other. The internal bus 7 is used for the CPU 11 and the internal units 3 to access the local memory 12.

The internal units 3 perform various processes in accordance with the intended use of the information processing system. For example, in the case where the information processing system is used for a car navigation system, examples of the internal units 3 include a drawing unit for drawing a map and storing the result in a local memory, an image display unit for outputting an image stored in a local memory to an external display device, a video input unit for capturing a video input signal from an external video input device and storing it in a local memory, and the like.

Furthermore, in the case where the information processing system is used for a car navigation system, examples of data transferred between the CPU 11 and the local memory 12 include an instruction for the CPU 11 to control the information processing system, image data stored in the local memory 12 by the information processing system, and the like. In Embodiment 1, although there are a plurality of internal units 3, the present invention is not limited thereto, and a single internal unit 3 may be used.

In Embodiment 1, the memory interface 4 includes a bus arbiter 5 and a priority processing interval managing part 6. The bus arbiter 5 arbitrates a request for use of the internal bus 7 by the external interface 2 and the internal units 3.

The request for use by the external interface 2 is made by asserting a bus request signal 9b transmitted from the external interface 2 to the memory interface 4 when the CPU 11 accesses the local memory 12. Furthermore, the request for use by the internal unit 3 is made by asserting a bus request signal 9a transmitted from the internal unit 3 to the memory interface 4 when the internal unit 3 accesses the local memory 12.

Figure 13:
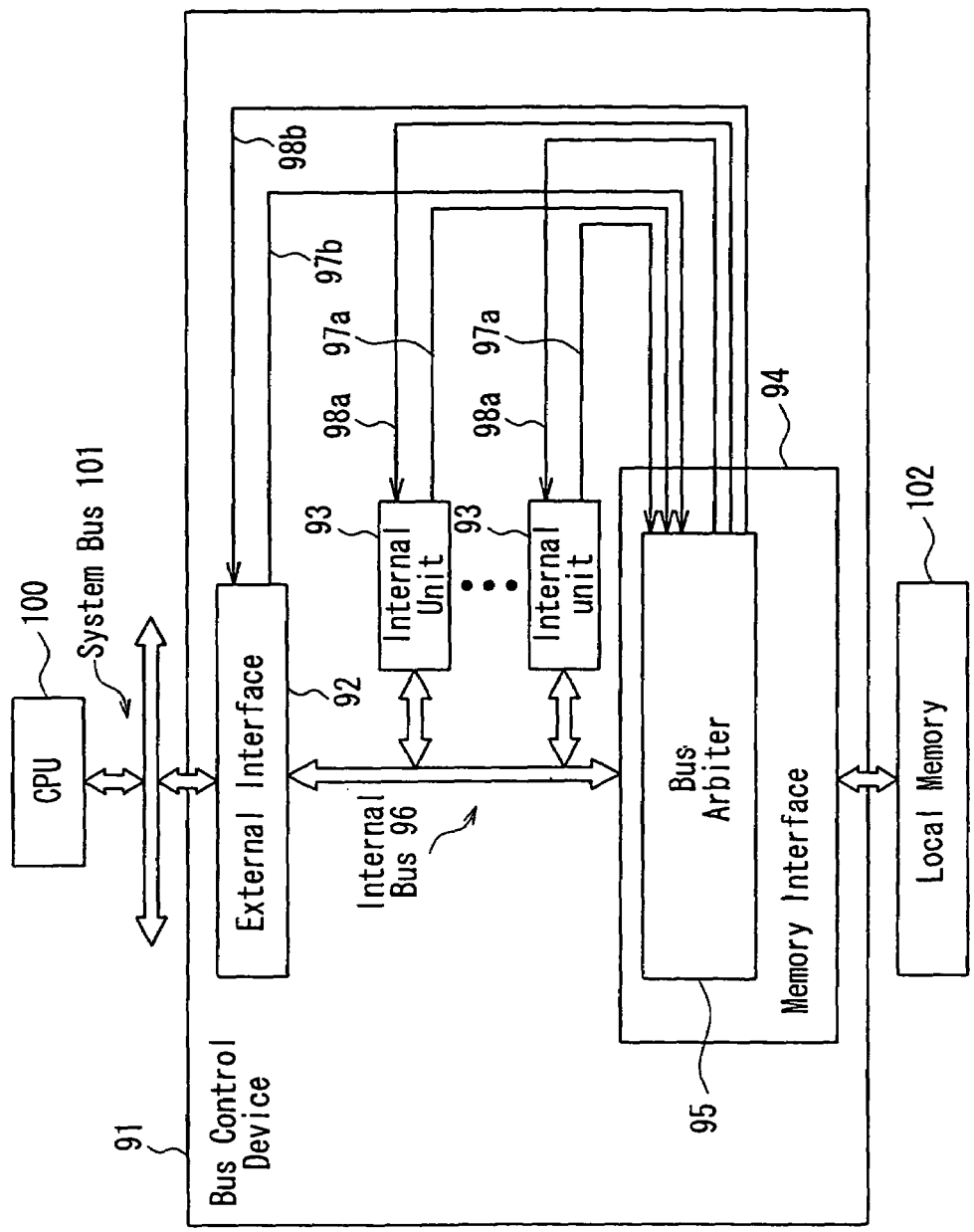
FIG. 13 is a view showing an exemplary configuration of a conventional bus control device.

In a normal processing interval shown in FIG. 2 (described later), the arbitration of the bus arbiter 5 is performed in the same way as with the bus arbiter 95 described in the prior art with reference to FIG. 13. Specifically, in the normal processing interval, in the case where only one unit among a plurality of units such as the external interface 2 and the internal units 3 is requesting the use of the internal bus 7, the bus arbiter 5 permits the requesting unit to use the internal bus 7. On the other hand, in the normal processing interval, in the case where a plurality of units are requesting the use of the internal bus 7, the bus arbiter 5 permits the use of the internal bus 7 based on a predetermined order of priority. This order of priority can be fixed in the course of production or changed dynamically.

Furthermore, in the case where the bus arbiter 5 permits the external interface 2 to use the internal bus 7 as a result of the arbitration, the bus arbiter 5 asserts a bus permission signal 10b transmitted to the external interface 2. On the other hand, in the case where the bus arbiter 5 permits the internal unit 3 to use the internal bus 7, the bus arbiter 5 asserts a bus permission signal 10a transmitted from the memory interface 4 to the internal unit 3.

The priority processing interval managing part 6 monitors the usage pattern of the internal bus 7 based on the result of the arbitration performed by the bus arbiter 5. The monitoring by the priority processing interval managing part 6 can be performed at all times or on a predetermined time basis. In the case where the priority processing interval managing part 6 determines that none of the internal units 3 is using the internal bus 7 as a result of the monitoring, the priority processing interval managing part 6 notifies the bus arbiter 5 and the external interface 2 that only the external interface 2 is permitted to use the internal bus 7, and sets a priority processing interval in which only the external interface 2 can use the internal bus 7.

Specifically, in the case where the priority processing interval managing part 6 determines that none of the internal units 3 is using the internal bus 7, the priority processing interval managing part 6 sets a priority processing interval by asserting a priority processing interval notification signal 8 transmitted to the bus arbiter 5 and the external interface 2. That is, the section in which the priority processing interval notification signal 8 is asserted corresponds to a priority processing interval shown in FIG. 2 (described later).

While the priority processing interval notification signal 8 is asserted (i.e., during the priority processing interval), the bus arbiter 5 permits only the external interface 2 to use the internal bus 7, thereby prohibiting the internal unit 3 from using the internal bus 7. More specifically, the bus arbiter 5 asserts the bus permission signal 10b output to the external interface 2, and negates the bus permission signal 10a output to the internal units 3.

The priority processing interval is completed when the priority processing interval managing part 6 negates the priority processing interval notification signal 8 after the request for use from the external interface 2 is completed (i.e., after the bus request signal 9b is negated).

Furthermore, when a priority processing interval is set, the external interface 2 notifies the CPU 11 that the priority processing interval is set in the internal bus 7, for example, by using an interrupt signal 14. In Embodiment 1, wiring for transmitting the priority processing interval notification signal 8 to the external interface 2 is provided separately from the internal bus 7. This wiring connects the external interface 2 and the memory interface 4 directly to each other.

Thus, according to Embodiment 1, the CPU 11 is notified of a time period (i.e., priority processing interval) in which the bus control device 1 can respond to the CPU 11 immediately. Therefore, the CPU 11 can access the bus control device 1 only when being notified of a priority processing interval, and preferentially transfer data with respect to another device connected via the system bus 13 when not being notified of a priority processing interval. As a result, the stand-by period of the CPU 11 for access to the local memory 12 can be shortened, so that the performance of the entire system can be enhanced.

Next, the operation of the bus control device according to Embodiment 1 will be described with reference to FIG. 2. FIG. 2 is a timing chart showing an exemplary operation of the bus control device according to Embodiment 1 of the present invention. In FIG. 2, all the signals are low-active, that is, all the signals are true at a low level.

Figure 2:
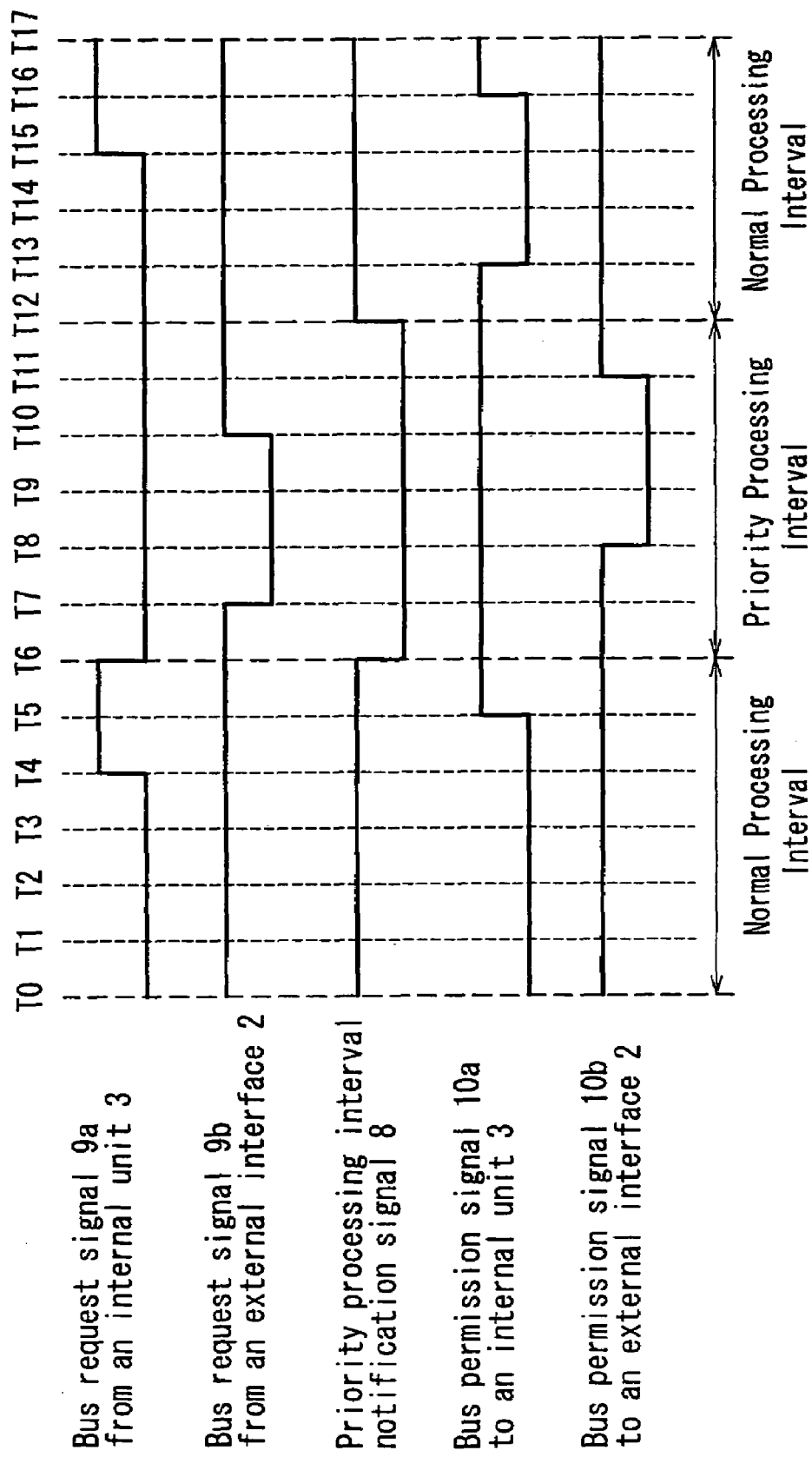
FIG. 2 is a timing chart showing an exemplary operation of the bus control device according to Embodiment 1 of the present invention.

As shown in FIG. 2, at timings T0 to T6, the bus arbiter 5 performs a normal arbitration with respect to the request for use by the external interface 2 and the internal unit 3. The timings T0 to T6 correspond to a normal processing interval.

When the bus arbiter 5 negates (timing T5) the bus permission signal 10a with respect to the internal unit 3 in response to the negation (timing T4) of the bus request signal 9a from the internal unit 3, the priority processing interval managing part 6 notifies that a priority processing interval is started by asserting the priority processing interval notification signal 8 with respect to the external interface 2 and the bus arbiter 5 at the timing T6. The external interface 2 having received the priority processing interval notification signal 8 outputs the interrupt signal 14 to the CPU 11, thereby indicating that a priority processing interval is started.

At a timing T7, the external interface 2 having been accessed by the CPU 11 requests the use of the internal bus 7 by asserting the bus request signal 9b with respect to the bus arbiter 5.

On the other hand, the internal unit 3 has already requested the use of the internal bus 7 by asserting the bus request signal 9a with respect to the bus arbiter 5 at the timing T6. However, the priority processing interval notification signal 8 from the priority processing interval managing part 6 has been asserted at the timing T6, so that the bus arbiter 5 ignores the request from the internal unit 3.

At a timing T8, the bus arbiter 5 permits the external interface 2 to use the internal bus 7 by asserting the bus permission signal 10b with respect to the external interface 2. As a result, the external interface 2 transfers data using the internal bus 7.

When the transfer of data is completed, the external interface 2 negates the bus request signal 9b with respect to the bus arbiter 5 at a timing T10. The bus arbiter 5, having determined that the request for use by the external interface 2 is completed based on the negation of the bus request signal 9b, negates the bus permission signal 10b with respect to the external interface 2 at a timing T11.

The priority processing interval managing part 6 having confirmed the negation of the bus permission signal 10b notifies that the priority processing interval is completed by negating the priority processing interval notification signal 8 with respect to the external interface 2 and the bus arbiter 5 at a timing T12. The external interface 2 having received the notification outputs the interrupt signal 14 to the CPU 11, thereby notifying that the priority processing interval is completed.

At timings T12 to T17, the process returns to a normal processing interval, and the bus arbiter 5 performs a normal arbitration with respect to the request for use by the external interface 2 and the internal unit 3 in the same way as in the timings T0 to T6.

According to the above-mentioned configuration, by using the bus control device and the information processing system according to Embodiment 1, the bus arbiter 5 can permit only the external interface 2 to use the internal bus 7 while the priority processing interval managing part 6 sets a priority processing interval. Therefore, the CPU 11 can access the local memory 12 within a short stand-by period, so that the performance of the entire system can be enhanced.

EMBODIMENT 2

Figure 3:
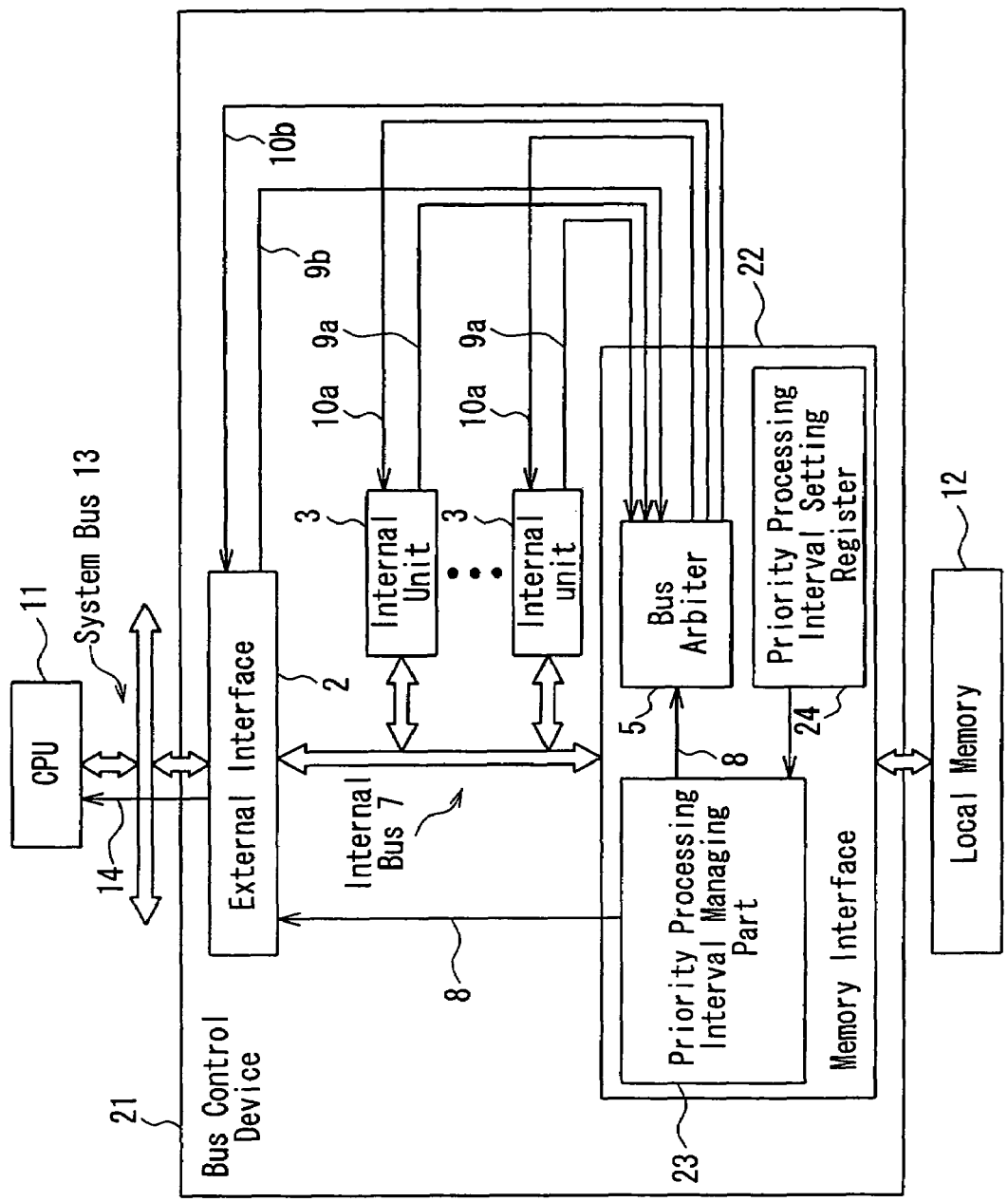
FIG. 3 is a view showing configurations of a bus control device and an information processing system according to Embodiment 2 of the present invention.

A bus control device and an information processing system according to Embodiment 2 of the present invention will be described with reference to FIGS. 3 and 4. First, the configurations of the bus control device and the information processing system according to Embodiment 2 will be described with reference to FIG. 3. FIG. 3 shows configurations of the bus control device and the information processing system according to Embodiment 2 of the present invention.

As shown in FIG. 3, the bus control device and the information processing system according to Embodiment 2 are the same as those of Embodiment 1, except for the configuration and function of a memory interface 22. In Embodiment 2, the memory interface 22 has a priority processing interval setting register 24 in addition to a bus arbiter 5 and a priority processing interval managing part 23. The bus arbiter 5 is the same as that in Embodiment 1.

In Embodiment 2, the length of a priority processing interval is set by a CPU 11, and information specifying the length of the set priority processing interval is stored in the priority processing interval setting register 24. The priority processing interval managing part 23 sets a priority processing interval based on the information stored in the priority processing interval setting register 24.

The length of the priority processing interval is set by the CPU 11, for example, in terms of the number of accesses, the amount of data, and the like. More specifically, in the case of setting the length of a priority processing interval in terms of the number of accesses, the CPU 11 sets the number of accesses by the external interface 2 recognized in the priority processing interval, and the set number of accesses is stored in the priority processing interval setting register 24. In this case, during the priority processing interval, accesses are performed by the external interface 2 by the set number, and the priority processing interval is completed when the last access is completed.

Furthermore, in the case where the length of the priority processing interval is set in terms of the amount of data, the CPU 11 sets the amount of data transferred between the external interface 2 and the memory interface 22 during the priority processing interval, and stores the set amount of data in the priority processing interval setting register 24. In this case, the set amount of data is transferred between the external interface 2 and the memory interface 22 during the priority processing interval, and the priority processing interval is completed when the transfer of the last data is completed.

Next, the operation of the bus control device according to Embodiment 2 will be described with reference to FIG. 4. FIG. 4 is a timing chart showing an exemplary operation of the bus control device according to Embodiment 2 of the present invention. In FIG. 4, all the signals are assumed to be low-active. Furthermore, FIG. 4 shows the case where the length of the priority processing interval is set by the CPU 11 in terms of the number of accesses, and the set number of accesses is two.

Figure 4:
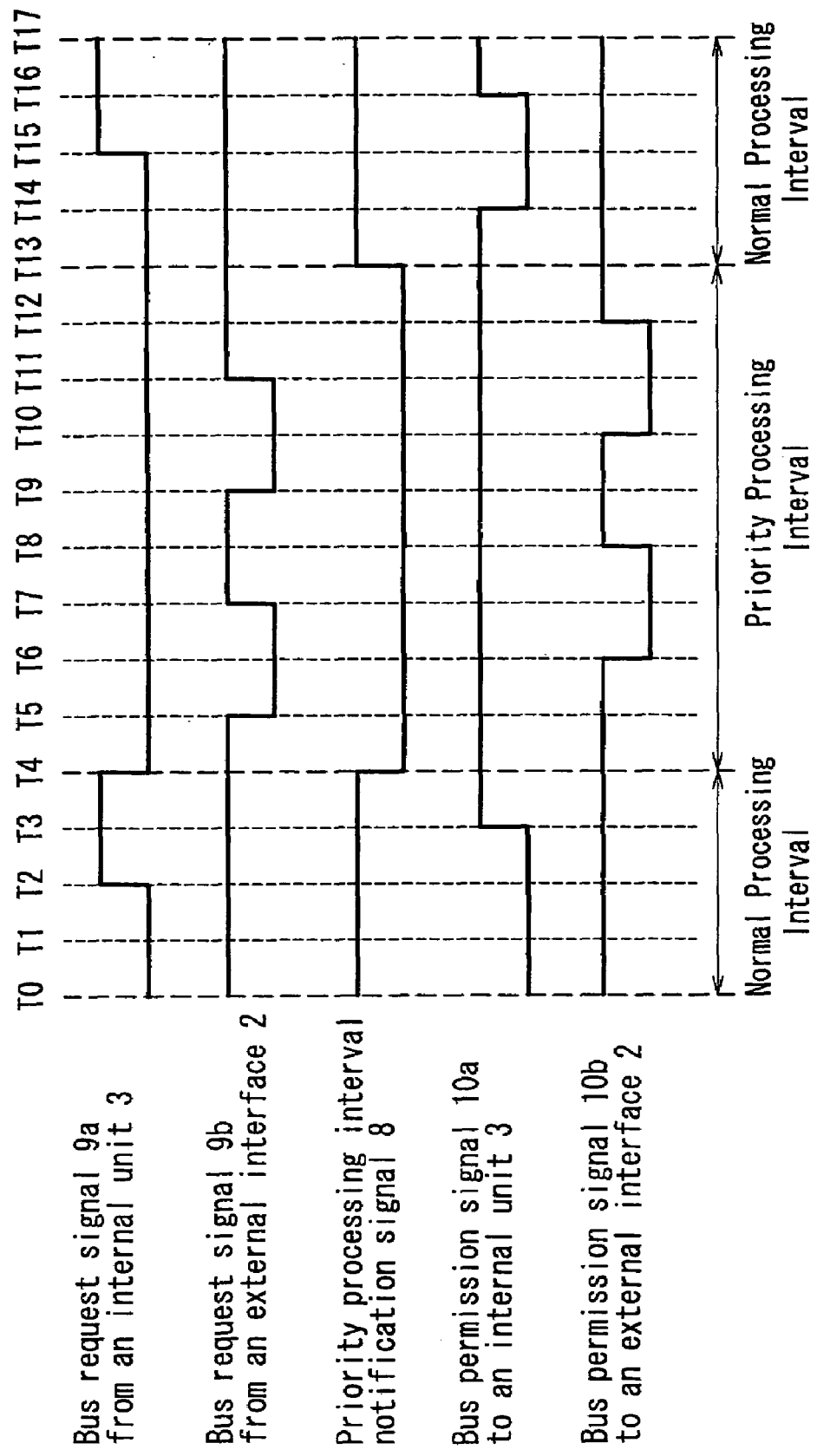
FIG. 4 is a timing chart showing an exemplary operation of the bus control device according to Embodiment 2 of the present invention.

As shown in FIG. 4, at timings T0 to T4, the bus arbiter 5 performs a normal arbitration with respect to the request for use by the external interface 2 and the internal unit 3. The timings T0 to T4 correspond to a normal processing interval.

When the bus arbiter 5 negates (timing T3) the bus permission signal 10a with respect to the internal unit 3 in response to the negation (timing T2) of the bus request signal 9a by the internal unit 3, the priority processing interval managing part 23 notifies that the priority processing interval is started by asserting the priority processing interval notification signal 8 with respect to the external interface 2 and the bus arbiter 5 at the timing T4. The external interface 2 notifies that the priority processing interval is started, by outputting the interrupt signal 14 to the CPU 11.

At a timing T5, the external interface 2 having been accessed by the CPU 11 requests the use of the internal bus 7 by asserting the bus request signal 9b with respect to the bus arbiter 5.

On the other hand, the internal unit 3 has already requested the use of the internal bus 7 by asserting the bus request signal 9a with respect to the bus arbiter 5 at the timing T4. However, the priority processing interval notification signal 8 from the priority processing interval managing part 23 has been asserted at the timing T4, so that the bus arbiter 5 ignores the request from the internal unit 3.

At a timing T6, the bus arbiter 5 permits the external interface 2 to use the internal bus 7 by asserting the bus permission signal 10*b* with respect to the external interface 2. As a result, the external interface 2 transfers data using the internal bus 7.

When the transfer of data is completed, the external interface 2 negates the bus request signal 9*b* with respect to the bus arbiter 5 at a timing T7. The bus arbiter 5, having determined that the request for use by the external interface 2 is completed based on the negation of the bus request signal 9*b*, negates the bus permission signal 10*b* with respect to the external interface 2 at a timing T8.

In Embodiment 1, a priority processing interval is completed after the bus arbiter 5 negates the bus permission signal 10*b* with respect to the external interface 2. However, in Embodiment 2, a priority processing interval is set with the number of accesses being two, so that the priority processing interval is not completed yet.

At a timing T9, the external interface 2 having been accessed by the CPU 11 for the second time requests the use of the internal bus 7 by asserting the bus request signal 9*b* with respect to the bus arbiter 5 for the second time.

At a timing T10, the bus arbiter 5 permits the external interface 2 to use the internal bus 7 by asserting the bus permission signal 10*b* with respect to the external interface 2 for the second time. As a result, the external interface 2 performs the second transfer of data using the internal bus 7.

When the second transfer of data is completed, the external interface 2 negates the bus request signal 9*b* with respect to the bus arbiter 5 at a timing T11. The bus arbiter 5, having determined that the second request for use by the external interface is completed based on the negation of the bus request signal 9*b*, negates the bus permission signal 10*b* with respect to the external interface 2 at a timing T12.

Since the external interface 2 has completed a series of accesses twice with respect to the internal bus 7, the priority processing interval managing part 23 notifies that a priority processing interval is completed by negating the priority processing interval notification signal 8 with respect to the external interface 2 and the bus arbiter 5 at a timing T13. The external interface 2 having received the notification outputs the interrupt signal 14 to the CPU 11, thereby notifying that the priority processing interval is completed.

At timings T13 to T17, the process returns to a normal processing interval, and the bus arbiter 5 performs a normal arbitration with respect to the request for use by the external interface 2 and the internal unit 3 in the same way as in the timings T0 to T4.

According to the above-mentioned configuration, even in the case of using the bus control device and the information processing system according to Embodiment 2, the same effect as that in Embodiment 1 can be obtained. Furthermore, in Embodiment 2, since the CPU 11 can set the length of a priority processing interval freely, the length of a priority processing interval can be set in accordance with the transfer amount of data transferred between the CPU 11 and the local memory 12, whereby the general versatility of the bus control device can be enhanced.

For example, in the case where the CPU 11 reads a large capacity of image data stored in a local memory by an information processing system and processes the image, the image processing can be suppressed from being delayed by setting the priority processing interval sufficiently long.

EMBODIMENT 3

Figure 5:
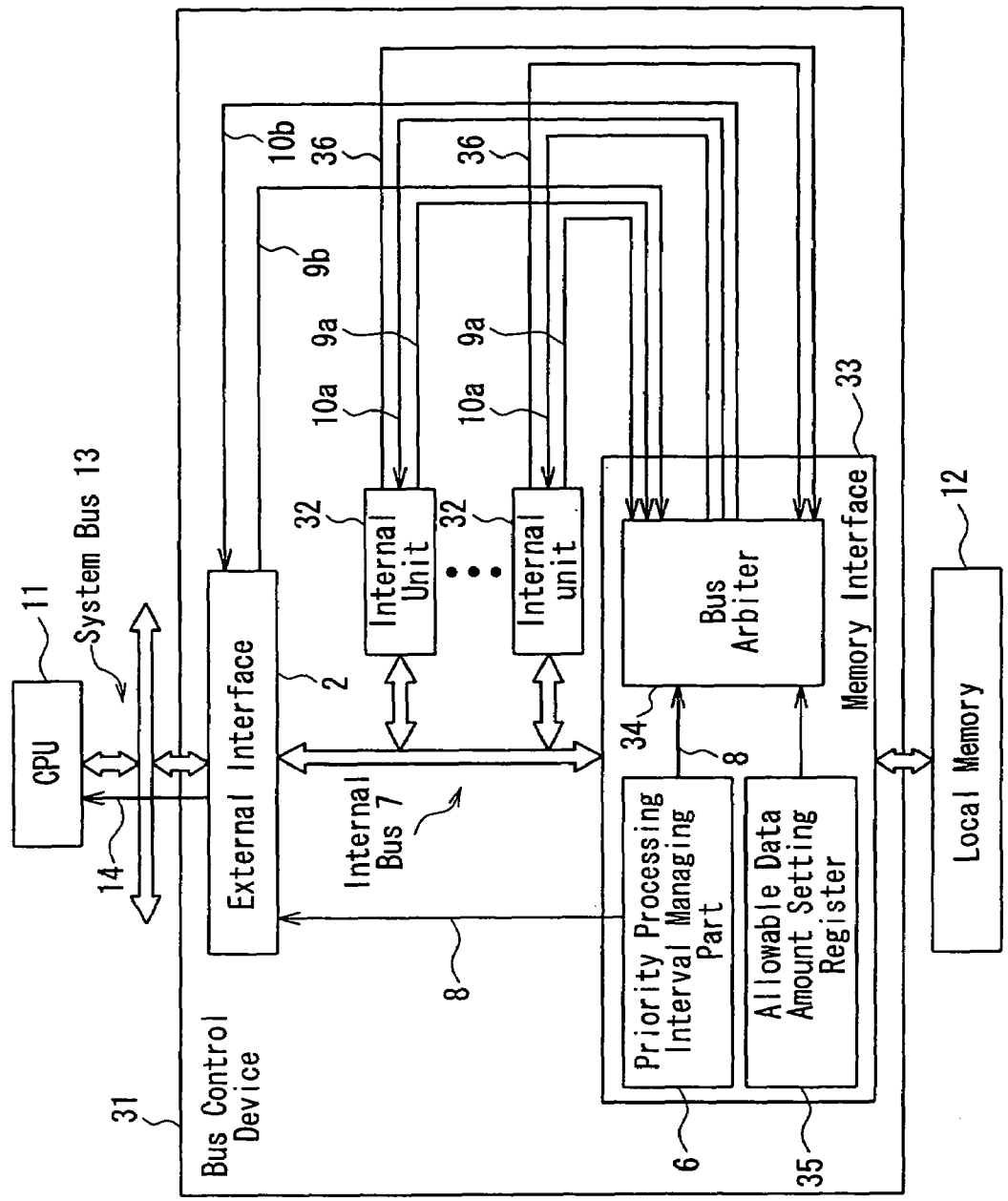
FIG. 5 is a view showing configurations of a bus control device and an information processing system according to Embodiment 3 of the present invention.

A bus control device and an information processing system according to Embodiment 3 of the present invention will be described with reference to FIGS. 5 and 6. First, the configurations of the bus control device and the information processing system according to Embodiment 3 will be described with reference to FIG. 5. FIG. 5 shows the configurations of the bus control device and the information processing system according to Embodiment 3 of the present invention.

As shown in FIG. 5, the bus control device and the information processing system according to Embodiment 3 are different from those of Embodiment 1, in the configuration and function of an internal unit 32 and a memory interface 33. In Embodiment 3, the use of the internal bus 7 by the internal unit 32 is permitted regarding the transfer of a predetermined amount of data during a priority processing interval. The other points are the same as those of Embodiment 1. In the present specification, the term "data amount" refers to the size of data specified in terms of the number of words and the like.

Specifically, in Embodiment 3, the memory interface 33 has an allowable data amount setting register 35 in addition to a bus arbiter 34 and a priority processing interval managing part 6. In the allowable data amount setting register 35, information specifying the amount of data allowed to be transferred by the internal unit 32 during the priority processing interval is stored. The priority processing interval managing part 6 is the same as that of Embodiment 1.

Furthermore, in Embodiment 3, the amount of data allowed to be transferred by the internal unit 32 during the priority processing interval is set by the CPU 11. The allowable data amount set by the CPU 11 is stored in the allowable data amount setting register 35.

The internal unit 32 notifies the bus arbiter 34 of the amount of data to be transferred, when requesting the use of the internal bus 7 with respect to the bus arbiter 34. Specifically, the internal unit 32 outputs a data amount notification signal 36 to the bus arbiter 34 while asserting the bus request signal 9*a*, thereby notifying the bus arbiter 34 of the amount of data to be transferred.

In the case where the bus arbiter 34 receives the request for use of the internal bus 7 and the amount of data to be transferred from the internal unit 32 during the priority processing interval, the bus arbiter 34 compares the amount of data stored in the allowable data amount setting register 35 with the notified amount of data. As a result of the comparison, if the amount of data to be transferred by the internal unit 32 is equal to or less than that stored in the allowable data amount setting register 35, the bus arbiter 34 permits the internal unit 32 to use the internal bus 7 during the priority processing interval.

Even in Embodiment 3, the bus arbiter 34 performs an arbitration with respect to the request for use of the internal bus 7 by the external interface 2 and the internal unit 32 in the same way as in Embodiment 1.

Next, the operation of the bus control device according to Embodiment 3 will be described with reference to FIG. 6. FIG. 6 is a timing chart showing an exemplary operation of the bus control device according to Embodiment 3 of the present invention. In FIG. 6, all the signals are assumed to be low-active. Furthermore, in FIG. 6, the amount of data allowed to be transferred by the bus arbiter 34 is 2 words. It is assumed that the minimum unit of data transferred once via the internal bus 7 is one word. In the case where the amount of data is equal to or less than 2 words, the bus arbiter 34 permits the internal unit 32 to use the internal bus 7.

Figure 6:
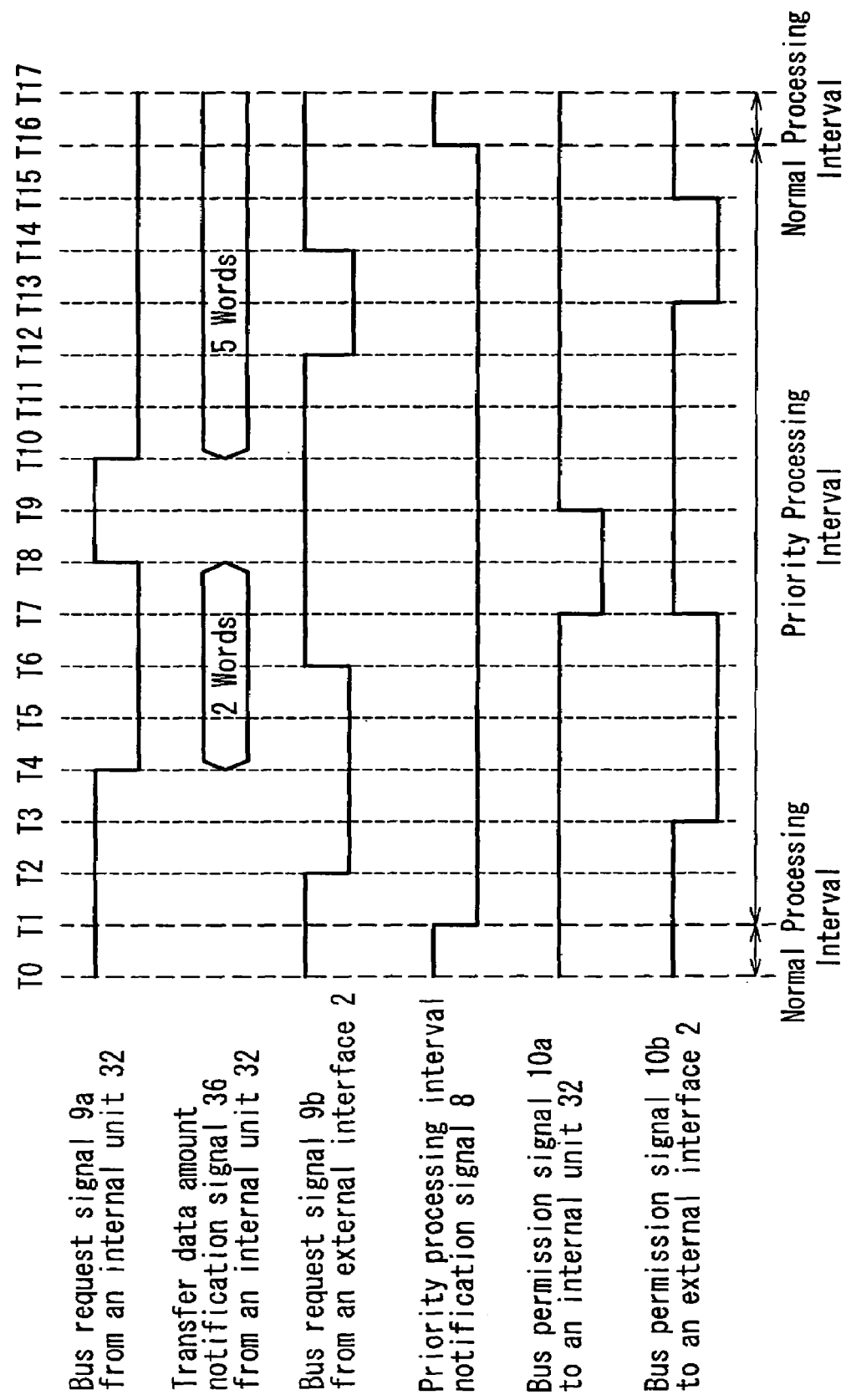
FIG. 6 is a timing chart showing an exemplary operation of the bus control device according to Embodiment 3 of the present invention.

As shown in FIG. 6, at a timing T1, the priority processing interval managing part 6 notifies that a priority processing interval is started by asserting the priority processing interval notification signal 8 with respect to the external interface 2 and the bus arbiter 34. The external interface 2 having received the priority processing interval notification signal 8 notifies that the priority processing interval is started, by outputting the interrupt signal 14 to the CPU 11.

At a timing T2, the external interface 2 having been accessed by the CPU 11 requests the use of the internal bus 7 by asserting the bus request signal 9*b* with respect to the bus arbiter 34.

Furthermore, at a timing T3, the bus arbiter 34 permits the external interface 2 to use the internal bus 7 by asserting the bus permission signal 10*b* with respect to the external interface 2. As a result, the external interface 2 transfers data using the internal bus 7.

When the transfer of data is completed, the external interface 2 negates the bus request signal 9*b* with respect to the bus arbiter 34 at a timing T6. The bus arbiter 34, having determined that the request for use by the external interface 2 is completed based on the negation of the bus request signal 9*b*, negates the bus permission signal 10*b* with respect to the external interface 2 at a timing T7.

Furthermore, at a timing T4, the internal unit 32 transmits a transfer data amount notification signal 36 indicating that the amount of data is two words, while asserting the bus request signal 9*a*.

Therefore, the bus arbiter 34 asserts the bus permission signal 10*a* with respect to the internal unit 32, while negating the bus permission signal 10*b*. As a result, the internal unit 32, having transmitted the transfer data amount notification signal 36 indicating that the amount of data is two words, is permitted to use the internal bus 7.

When the transfer of data is completed, and the internal unit 32 negates the bus request signal 9*a* with respect to the bus arbiter 34 at a timing T8, the bus arbiter 34 negates the bus permission signal 10*a* with respect to the internal unit 32 at a timing T9.

At a timing T12, the external interface 2 having been accessed by the CPU 11 requests the use of the internal bus 7 by asserting an additional bus request signal 9*b* with respect to the bus arbiter 5.

Furthermore, at a timing T13, the bus arbiter 34 permits the external interface 2 to use the internal bus 7 again by asserting the bus permission signal 10*b* with respect to the external interface 2.

When the transfer of data is completed, at a timing T14, the external interface 2 negates the bus request signal 9*b* with respect to the bus arbiter 34. Then, at a timing T15, the bus arbiter 34 negates the bus permission signal 10*b* with respect to the external interface 2.

On the other hand, the internal unit 32 requests the use of the internal bus 7 again by asserting the bus request signal 9*a* with respect to the bus arbiter 5 at a timing T10; however, the amount of data to be transferred is 5 words. Therefore, the bus arbiter 34 ignores the request from the internal unit 32.

At a timing T16, the priority processing interval managing part 6 notifies that the priority processing interval is completed by negating the priority processing interval notification signal 8 with respect to the external interface 2 and the bus arbiter 34. The external interface 2 having received the notification notifies that the priority processing interval is completed by outputting the interrupt signal 14 to the CPU 11. Thereafter, the process returns to a normal processing interval, and the bus arbiter 34 performs a normal arbitration with respect to the request for use by the external interface 2 and the internal unit 32.

According to the above-mentioned configuration, in the case of using the bus control device and the information processing system according to Embodiment 3, the internal unit 32 can access the local memory 12 even during a priority processing interval. Furthermore, during the priority processing interval, the amount of data that can be transferred from the internal unit 32 to the local memory 12 is limited. Therefore, the processing by the internal unit 32 can proceed while a stand-by period for access from the CPU 11 to the local memory 12 is reduced, so that the performance of the entire system can be enhanced.

EMBODIMENT 4

Figure 7:
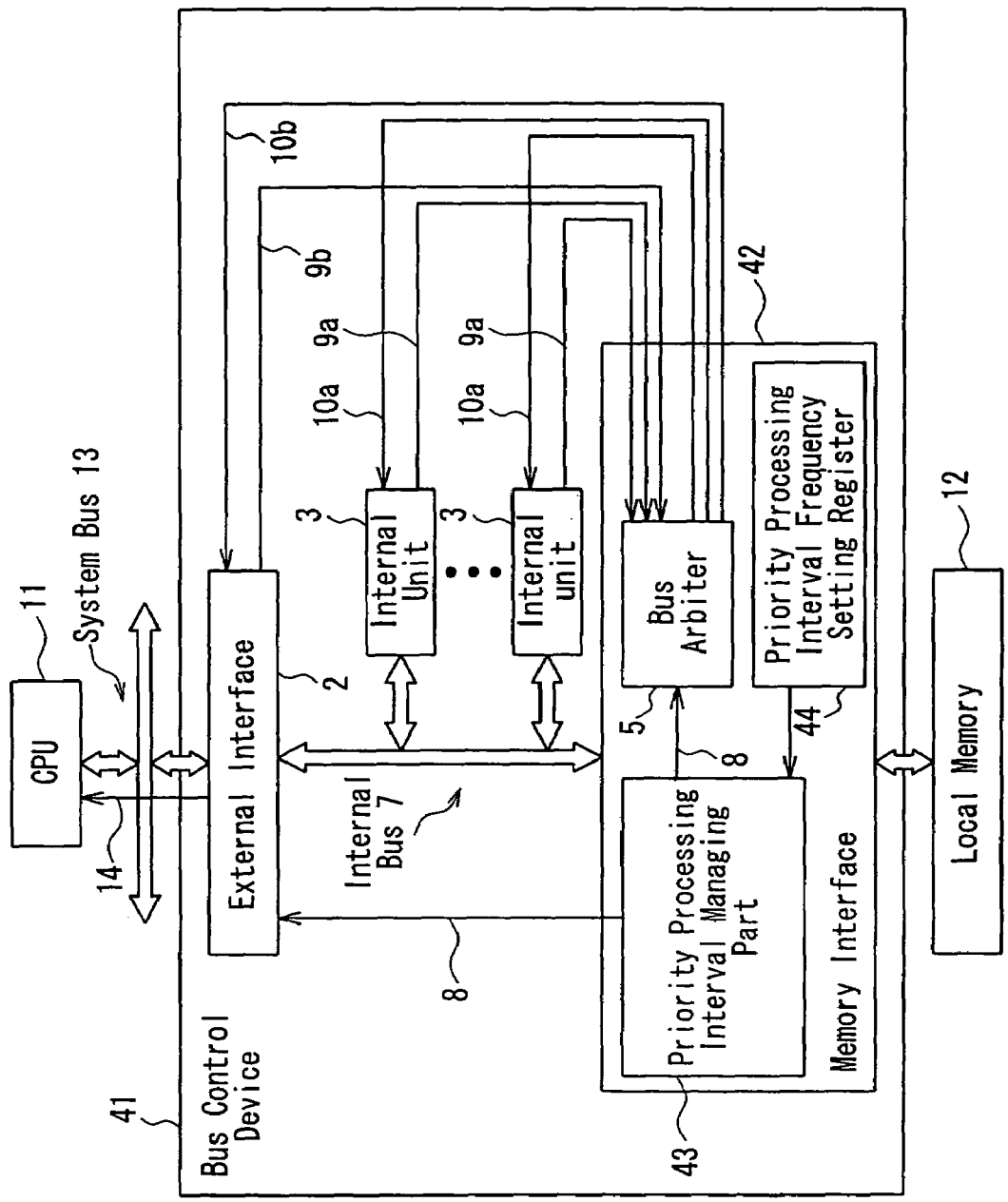
FIG. 7 is a view showing configurations of a bus control device and an information processing system according to Embodiment 4 of the present invention.

A bus control device and an information processing system according to Embodiment 4 of the present invention will be described with reference to FIG. 7. FIG. 7 shows configurations of the bus control device and the information processing system according to Embodiment 4 of the present invention.

As shown in FIG. 7, the bus control device and the information processing system according to Embodiment 4 are the same as those in Embodiment 1, except for the configuration and function of a memory interface 42. In Embodiment 4, the memory interface 42 includes a priority processing interval frequency setting register 44, in addition to a bus arbiter 5 and a priority processing interval managing part 43. The bus arbiter 5 is the same as that in Embodiment 1.

In the priority processing interval frequency setting register 44, the frequency at which the priority processing interval managing part 43 confirms the result of an arbitration performed by the bus arbiter 5 is set, and the priority processing interval managing part 43 monitors the usage pattern of the internal bus 7 by confirming an arbitration result at the set frequency. Furthermore, in Embodiment 4, the frequency at which the priority processing interval managing part 43 confirms an arbitration result is set by the CPU 11 in accordance with the access frequency from the CPU 11 to the local memory 12.

If any of the internal units 3 is using the internal bus 7 as a result of the confirmation, the priority processing interval managing part 43 sets a priority processing interval by asserting the priority processing interval notification signal 8 in the same way as in Embodiment 1.

Therefore, in Embodiment 4, a priority processing interval can be set in accordance with the access frequency from the CPU 11 to the local memory 12. For example, in the case where the CPU 11 transfers data required to be updated often, such as a drawing command, to the local memory 12, the frequency at which an arbitration result is confirmed is increased, thereby suppressing a decrease in the processing speed in the CPU 11. Thus, according to Embodiment 4, a bus control device with a high general versatility can be obtained.

In Embodiment 4, an example of a factor determining the frequency at which the result of a bus arbitration is confirmed includes a time. The priority processing interval managing part 43 monitors an arbitration result on the basis of a time set in the priority processing interval frequency setting register 44.

EMBODIMENT 5

Figure 8:
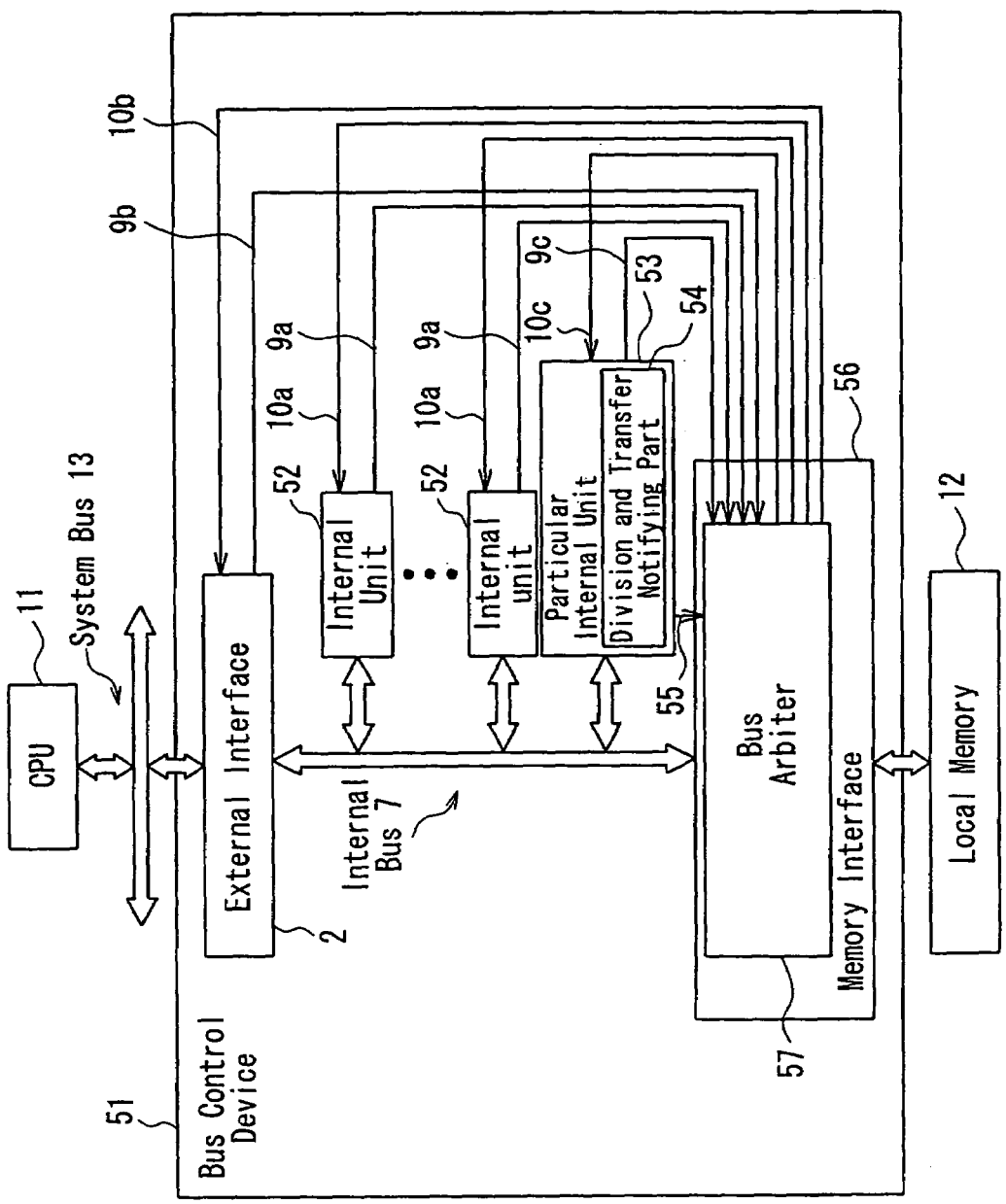
FIG. 8 is a view showing configurations of a bus control device and an information processing system according to Embodiment 5 of the present invention.

A bus control device and an information processing system according to Embodiment 5 of the present invention will be described with reference to FIGS. 8 and 9. First, the configurations of the bus control device and the information processing system according to Embodiment 5 will be described with reference to FIG. 8. FIG. 8 shows the configurations of the bus control device and the information processing system according to Embodiment 5 of the present invention.

As shown in FIG. 8, even in Embodiment 5, the bus control device includes an external interface 2, internal units 52 and 53, a memory interface 56, and an internal bus 7, in the same way as in Embodiment 1. Furthermore, the information processing system according to Embodiment 5 has a configuration in which the external interface 2 is connected to a CPU 11 that is an external device via an external system bus 13, and the memory interface 56 is connected directly to an external local memory 12.

In Embodiment 5, the internal unit 52 is the same as that shown in Embodiment 1. Unlike the internal unit 52, the internal unit 53 has a function of dividing data to be transferred to the memory interface 56 via the internal bus 7 and thereafter transferring it.

Furthermore, the internal unit 53 has a division and transfer notifying part 54. In the case where divided data is transferred through the internal bus 7, the division and transfer notifying part 54 notifies the memory interface 56 that the divided data is being transferred during a period before the transfer of the entire divided data is completed.

In Embodiment 5, the notification that the divided data is being transferred is performed by asserting the division and transfer notification signal 55 transmitted from the division and transfer notifying part 54 to the memory interface 56. Furthermore, the request for use by the internal unit 53 is performed by asserting a bus request signal 9c transmitted from the internal unit 53 to the memory interface 56.

The request for use by the internal unit 52 and the external interface 2 is performed in the same way as in Embodiment 1. Furthermore, in the following description, the internal unit 53 is referred to as a "particular internal unit" 53 so as to be distinguished from the internal unit 52.

The memory interface 56 has a bus arbiter 57 that performs an arbitration with respect to the request for use by the external interface 2, the internal unit 52, and the particular internal unit 53, in the same way as in Embodiment 1. In Embodiment 5, the bus arbiter 57 permits only the external interface 2 and the particular internal unit 53 to use the internal bus 7 during a period before the transfer of the entire divided data is completed, i.e., while the division and transfer notification signal 55 is asserted, and prohibits the internal unit 52 from using the internal bus 7.

In the case of permitting the particular internal unit 53 to use the internal bus 7, the bus arbiter 57 asserts the bus permission signal 10c transmitted from the memory interface 56 to the particular internal unit 53. In the case of permitting the internal unit 52 and the external interface 2 to use the internal bus 7, the bus arbiter 57 functions in the same way as in Embodiment 1.

Next, the operation of the bus control device according to Embodiment 5 will be described with reference to FIG. 9. FIG. 9 is a timing chart showing an exemplary operation of the bus control device according to Embodiment 5 of the present invention. In FIG. 9, all the signals are assumed to be low-active. In the example shown in FIG. 9, the particular internal unit 53 divides data to be transferred to the memory interface 56 via the internal bus 7 into two.

Figure 9:
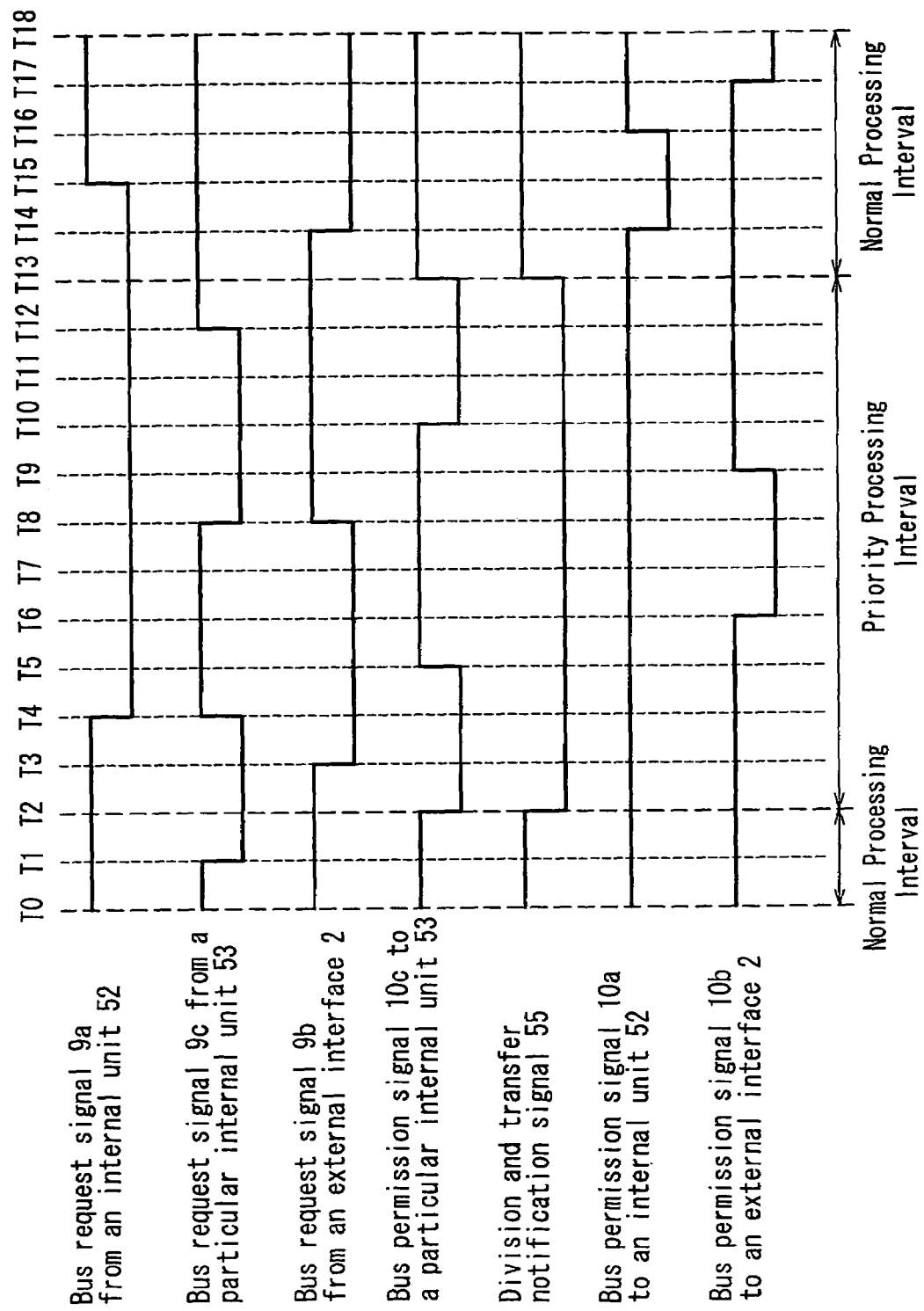
FIG. 9 is a timing chart showing an exemplary operation of the bus control device according to Embodiment 5 of the present invention.

As shown in FIG. 9, at timings T0 to T2, the bus arbiter 57 performs a normal arbitration. The timings T0 to T2 correspond to a normal processing interval. At the timing T1, the particular internal unit 53 asserts the bus request signal 9c with respect to the bus arbiter 57.

When the bus request signal 9c from the particular internal unit 53 is asserted, at the timing T2, the bus arbiter 57 asserts a bus permission signal 10c with respect to the particular internal unit 53, and permits the particular internal unit 53 to transfer data. Simultaneously, at the timing T2, the division and transfer notifying part 54 asserts the division and transfer notification signal 55.

The particular internal unit 53 negates the bus request signal 9c at the timing T4 and opens the internal bus 7 at a timing T5, since data is transferred after being divided into two (in the example shown in FIG. 9). When the particular internal unit 53 opens the internal bus 7, the bus arbiter 57 performs an arbitration at the timing T5.

At this time, since the division and transfer notification signal 55 is asserted, the bus arbiter 57 ignores the request for use by the bus request signal 9a from the internal unit 52. On the other hand, the bus arbiter 57 receives the request for use by the bus request signal 9b from the external interface 2, and asserts the bus permission signal 10b with respect to the external interface 2 at a timing T6.

The external interface 2 having completed the transfer of data negates the bus request signal 9b at a timing T8. When the bus request signal 9b is negated, the bus arbiter 57 negates the bus permission signal 10b with respect to external interface 2 and opens the internal bus 7 at a timing T9.

When the external interface 2 opens the internal bus 7, the bus arbiter 57 performs an arbitration at a timing T10. Even in this case, the division and transfer notification signal 55 is still asserted, so that the bus arbiter 57 ignores the request for use by the bus request signal 9a from the internal unit 52. On the other hand, at a timing T8, since the bus request signal 9c from the particular internal unit 53 is asserted, the bus arbiter 57 accepts the request for use from the particular internal unit 53 to assert the bus permission signal 10c at a timing T10.

At a timing T12, the entire divided data by the particular internal unit 53 is completed. Therefore, the particular internal unit 53 negates the bus request signal 9c. Furthermore, at a timing T13, the division and transfer notifying part 54 negates the division and transfer notification signal 55. Thereafter, at timings T13 to T18, the bus arbiter 57 performs a normal arbitration.

According to the above configuration, in the bus control device and the information processing system according to Embodiment 5, while the division and transfer notification signal 55 is asserted, the bus arbiter 57 can prohibit the internal unit 52 from using the internal bus 7. Therefore, even in Embodiment 5, a stand-by period for access from the CPU 11 to the local memory 12 can be reduced in the same way as in Embodiment 1.

For example, in the case where the particular internal unit 53 is an image display unit for transferring image data on the local memory 12 to an external display device and allowing the external display device to display an image, it is necessary that the transfer of data between the particular internal unit 53 and the local memory 12 is completed within a desired period depending upon the external display device. In this case, according to Embodiment 5, the transfer of data between the particular internal unit 53 and the local memory 12 can be completed within the desired period, depending upon the amount of data transferred between the CPU 11 and the local memory 12. Therefore, the performance of the entire system can be enhanced.

EMBODIMENT 6

Figure 10:
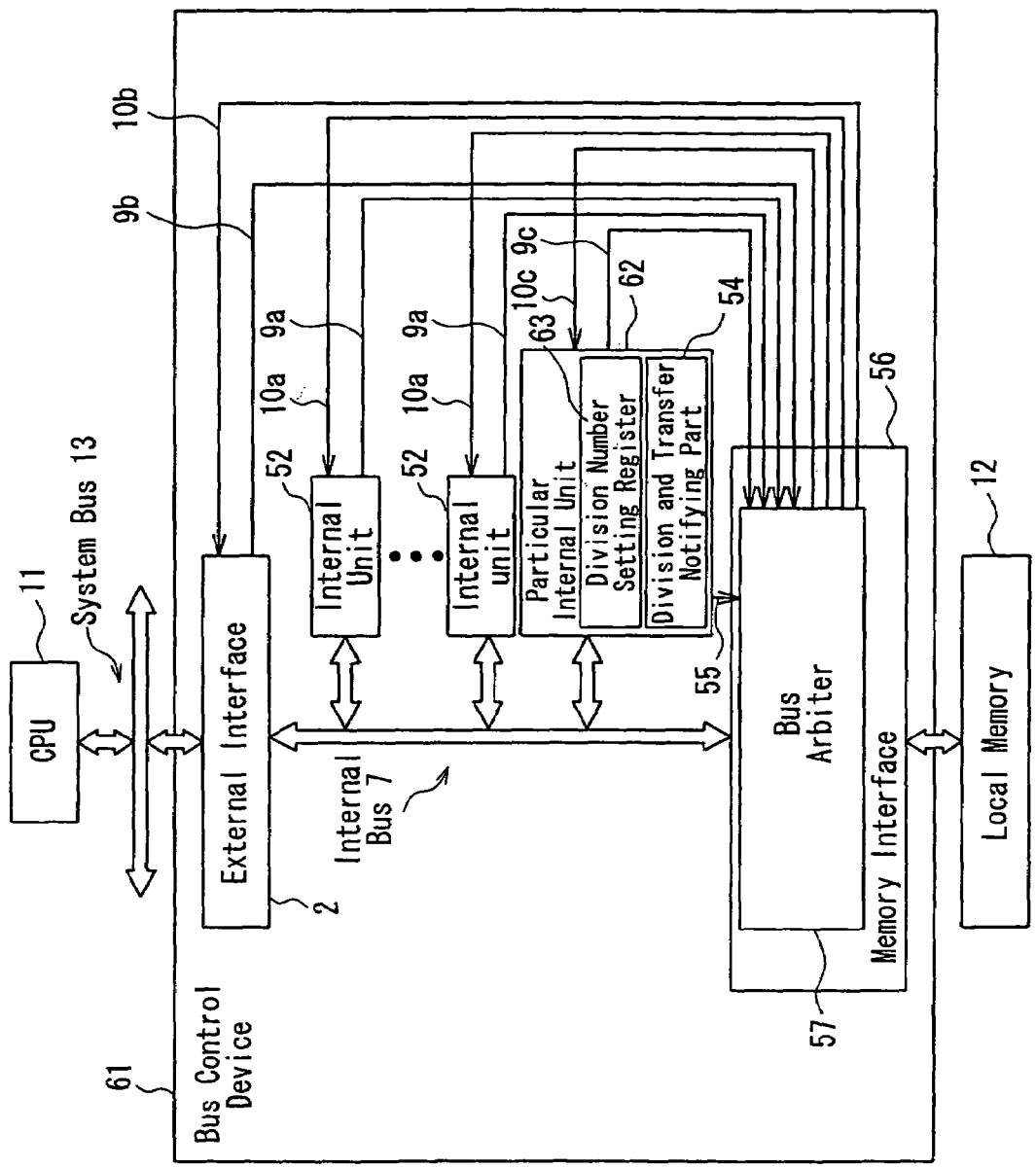
FIG. 10 is a view showing configurations of a bus control device and an information processing system according to Embodiment 6 of the present invention.

Next, a bus control device and an information processing system according to Embodiment 6 of the present invention will be described with reference to FIG. 10. FIG. 10 shows the configurations of the bus control device and the information processing system according to Embodiment 6 of the present invention.

The bus control device and the information processing system according to Embodiment 6 are the same as those in Embodiment 5, except that a particular internal unit 62 including a division and transfer notifying part 54 further includes a division number setting register 63.

In the division number setting register 63, information for setting the division number of data to be transferred is stored. The particular internal unit 62 divides data to be transferred based on the information stored in the division number setting register 63, and asserts the bus request signal 9c on the basis of the divided data, thereby requesting the use of the internal bus 7.

In Embodiment 6, examples of the information stored in the division number setting register 63 include the amount of data allowed to be transferred in one access to the internal bus 7, the number by which the particular internal unit 62 can access the memory interface 56 (number of accesses), and the like.

In the former case, the particular internal unit 62 divides data so that the amount of each data after being divided is equal to or less than an allowable amount, and accesses the memory interface 56 only by the division number, thereby transferring the data. Furthermore, in the latter case, data is transferred under the condition of being divided by the set number of accesses.

According to the above-mentioned configuration, in the bus control device and the information processing system according to Embodiment 6, the amount of data to be transferred by one access of the particular internal unit 62 to the local memory 12 and the number of accesses can be set freely, in accordance with the frequency of data transfer of the CPU 11 and the importance of data to be transferred by the particular internal unit 62 or the CPU 11. Therefore, a bus control device with high general versatility can be obtained.

EMBODIMENT 7

Figure 11:
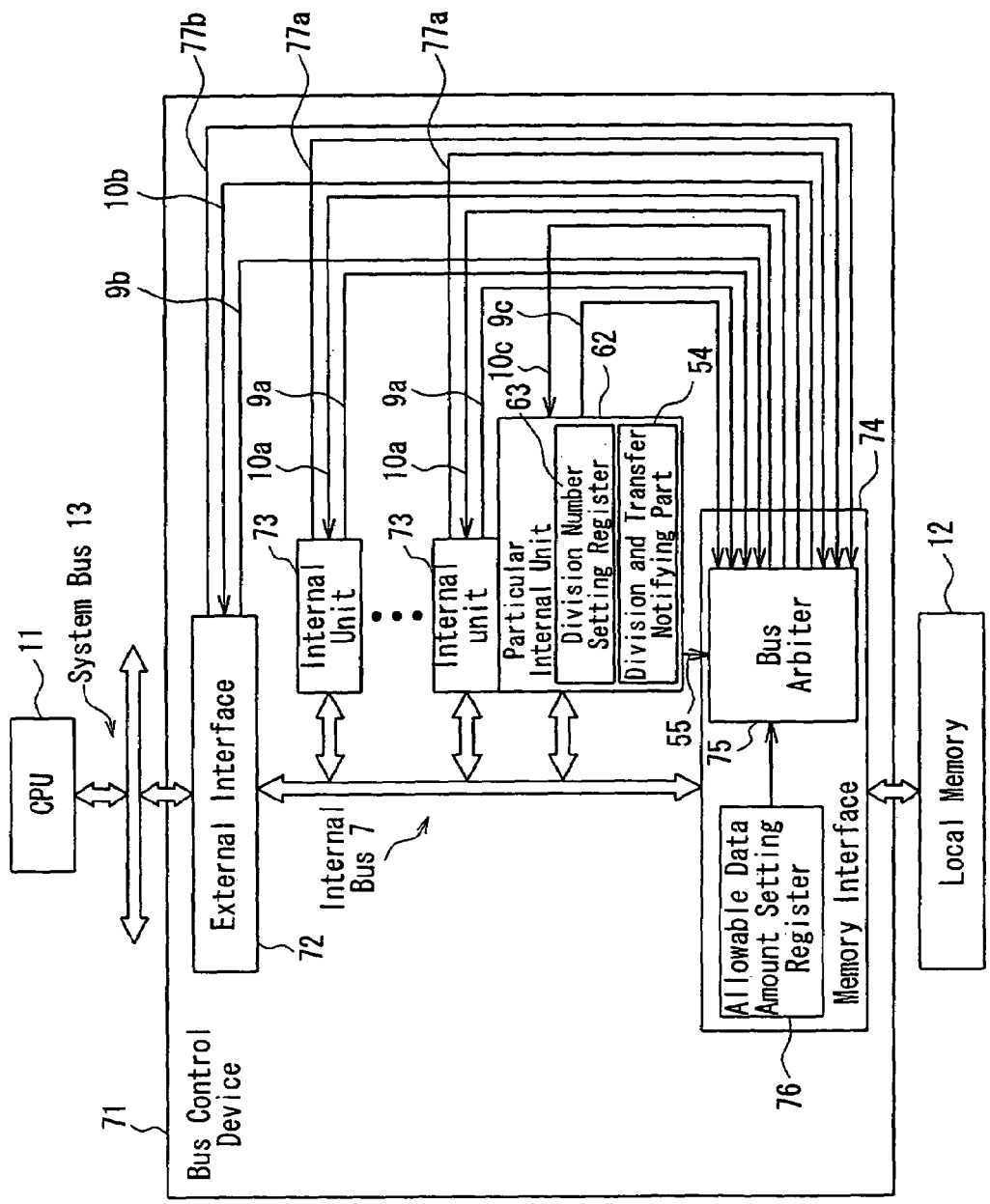
FIG. 11 is a view showing configurations of a bus control device and an information processing system according to Embodiment 7 of the present invention.

Next, a bus control device and an information processing system according to Embodiment 7 of the present invention will be described with reference to FIGS. 11 and 12. First, the configurations of the bus control device and the information processing system according to Embodiment 7 will be described with reference to FIG. 11. FIG. 11 shows the configurations of the bus control device and the information processing system according to Embodiment 7 of the present invention.

The bus control device and the information processing system according to Embodiment 7 include an external interface 72, internal units 73, a particular internal unit 62, an internal bus 7, and a memory interface 74 in the same way as in Embodiment 6.

In Embodiment 7, the internal unit 73 also can be permitted to use the internal bus 7 under a predetermined condition during a period before the transfer of entire divided data is completed. Therefore, the functions of the external interface 72, the internal unit 73, and the memory interface 74 are different from those of Embodiment 6. The particular internal unit 62 is the same as that in Embodiment 6.

More specifically, in Embodiment 7, the external interface 72 and the internal unit 73 have the functions of notifying the bus arbiter 75 of the memory interface 74 of the amount of data to be transferred, as well as requesting the use of the internal bus 7 with respect to the bus arbiter 75. In FIG. 11, reference numeral 77a denotes a transfer data amount notification signal that is output by the internal unit 73 so as to notify the bus arbiter 75 of the amount of data, and 77b denotes a transfer data amount notification signal that is output by the external interface 72 so as to notify the bus arbiter 75 of the amount of data.

Furthermore, in Embodiment 7, in the case where the bus arbiter 75 receives the request for use of the internal bus 7 and the notification of the amount of data to be transferred from one or both of the external interface 72 and the internal unit 73, while being notified that the divided data is being transferred, the bus arbiter 75 compares the previously set amount of data with the amount of data to be transferred. Based on this comparison, the bus arbiter 75 determines whether one or both of the external interface 72 and the internal unit 73 is intended to transfer the amount of data equal to or less than the predetermined set amount.

In the case where one or both of the external interface 72 and the internal unit 73 is intended to transfer the amount of data equal to or less than the previously set amount, the bus arbiter 75 permits the use of the internal bus 7 by those that are intended to transfer the amount of data equal to or less than the previously set amount, while being notified that the divided data is being transferred.

On the other hand, in the case where the amount of data exceeding the previously set amount is intended to be transferred, the bus arbiter 75 ignores the request for use from those that have notified the bus arbiter 75 that the amount of data exceeding the previously set amount is intended to be transferred.

Furthermore, in Embodiment 7, the amount of data allowed to be transferred by the external interface 72 and the internal unit 73 while the bus arbiter 75 is notified that the divided data is being transferred is set by the CPU 11. The amount of data to be set may be varied between the external interface 72 and the internal unit 73, and in the case where there are a plurality of internal units 73 in the system, the amount of data may be varied on the internal unit 73 basis. Furthermore, the memory interface 74 includes an allowable data amount setting register 76, and information specifying the amount of data set by the CPU 11 is stored in the allowable data amount setting register 76.

Next, the operation of the bus control device according to Embodiment 7 will be described with reference to FIG. 12. FIG. 12 is a timing chart showing an exemplary operation of the bus control device according to Embodiment 7 of the present invention. In FIG. 12, all the signals are assumed to be low-active. Even in FIG. 12, the particular internal unit 62 divides data to be transferred to the memory interface 74 via the internal bus 7 into two in the same way as in FIG. 9.

Figure 12:
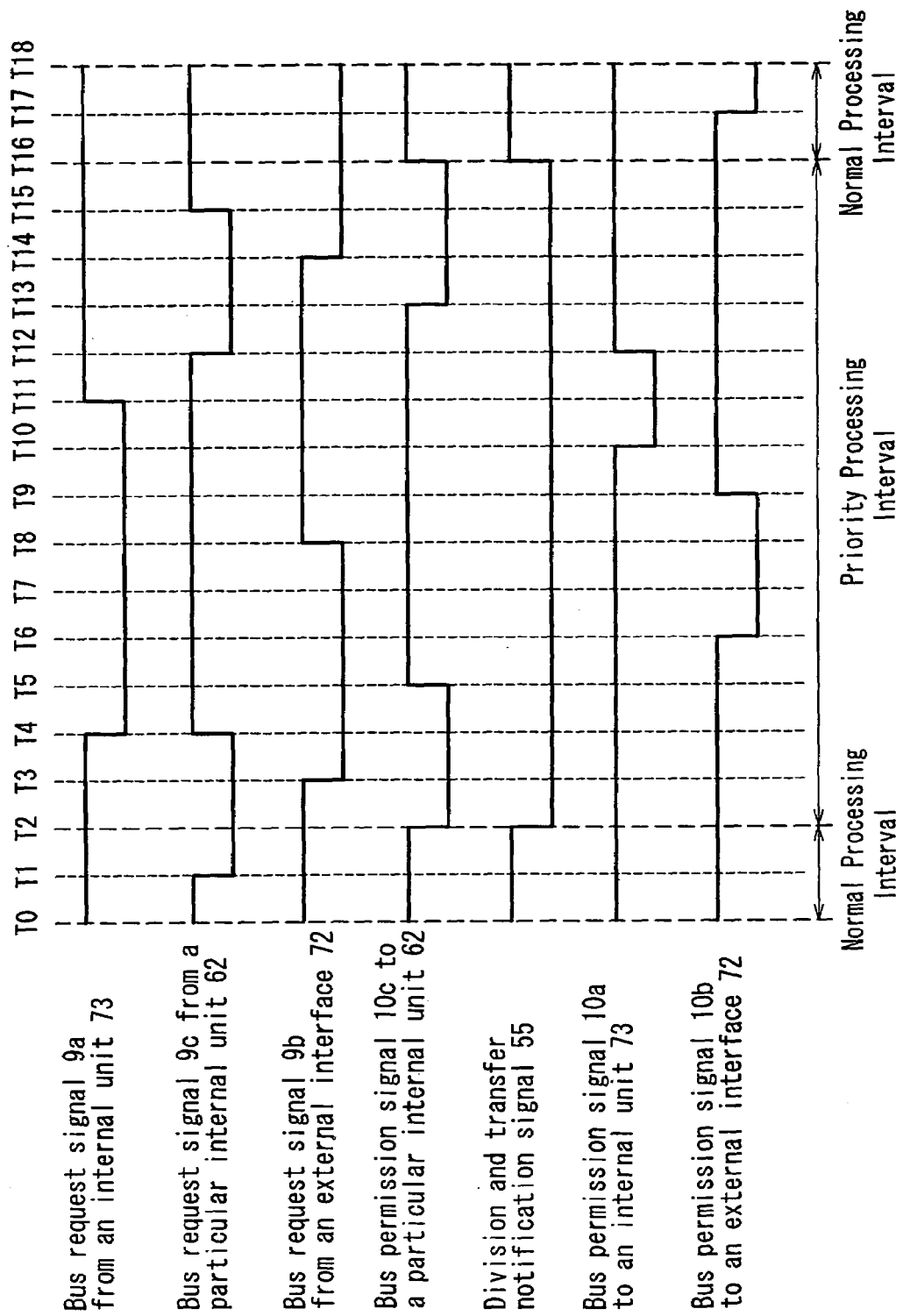
FIG. 12 is a timing chart showing an exemplary operation of the bus control device according to Embodiment 7 of the present invention.

As shown in FIG. 12, at timings T0 to T2, the bus arbiter 75 performs a normal arbitration. The timings T0 to T2 correspond to a normal processing interval. At the timing T1, the particular internal unit 62 asserts the bus request signal 9c with respect to the bus arbiter 75.

When the bus request signal 9c from the particular internal unit 62 is asserted, the bus arbiter 75 permits the particular internal unit 62 to transfer data by asserting the bus permission signal 10c with respect to the particular internal unit 62 at the timing T2. Simultaneously, at the timing T2, the division and transfer notifying part 54 asserts the division and transfer notification signal 55.

Even in the example shown in FIG. 12, the particular internal unit 62 negates the bus request signal 9c at a timing T4 and opens the internal bus 7 at a timing T5, since data is transferred after being divided into two. When the particular internal unit 62 opens the internal bus 7, the bus arbiter 75 performs an arbitration with respect to the request for a bus use from the external interface 72 and the internal unit 73 at the timing T5.

At this time, the division and transfer notification signal 55 is asserted. Therefore, the bus arbiter 75 compares the amount of data to be transferred by the external interface 72 and the internal unit 73 with the amount of data stored in the allowable data amount setting register 76, and determines whether or not the amount of data to be transferred exceeds the amount of data stored in the allowable data amount setting register 76. As a result of the determination, the bus arbiter 75 ignores the request for use regarding the amount of data to be transferred that exceeds the amount of data stored in the allowable data amount setting register 76.

In the example shown in FIG. 12, at the timing T5, the amount of data to be transferred by the external interface 72 and the internal unit 73 is equal to or less than the amount of data stored in the allowable data amount setting register 76. Therefore, the bus arbiter 75 performs an arbitration with respect to the request for bus use by the external interface 72 and the internal unit 73.

Furthermore, at this time, the bus arbiter 75 determines an order of priority. In the example shown in FIG. 12, the priority of the request for bus use by the external interface 72 is high, so that the bus arbiter 75 asserts the bus permission signal 10b with respect to the external interface 72 at a timing T6. Examples of the method for determining the order of priority include previously determining the order of priority, changing the order of priority with the passage of time, and the like.

When the transfer of data is completed, the external interface 72 negates the bus request signal 9b at a timing T8. Furthermore, at a timing T9, the bus arbiter 75 opens the internal bus 7.

At a timing T10, the bus arbiter 75 asserts the bus permission signal 10b with respect to the internal unit 73 that asserts the bus request signal 9a. When the bus permission signal 10b is asserted, the internal unit 73 transfers data. When the transfer of data is completed, the internal unit 73 negates the bus request signal 9a at a timing T11. When the bus request signal 9a is negated, the bus arbiter 75 opens the internal bus 7 by negating the bus permission signal 10a at a timing T12.

At the timing T12, the particular internal unit 62 further asserts the bus request signal 9c. Therefore, the bus arbiter 75 asserts the bus permission signal 10c with respect to the particular internal unit 62 at a timing T13.

After completing the transfer of data, the particular internal unit 62 negates the bus request signal 9c at a timing T15. When the bus request signal 9c is negated, the bus arbiter 75 negates the bus permission signal 10c to open the internal bus 7 at a timing T16.

Simultaneously, at the timing 16, the division and transfer notifying part 54 negates the division and transfer notification signal 55. At timings T16 to T18, the bus arbiter 75 performs a normal arbitration.

According to the above-mentioned configuration, in the bus control device and the information processing system according to Embodiment 7, all the components connected to the internal bus 7 can use the internal bus 7 under a predetermined condition while the division and transfer notification signal 55 is asserted. Therefore, the performance of the entire system can be enhanced.

Furthermore, the amount of data that can be transferred by the external interface 72 and the internal unit 73 can be set freely, in accordance with the importance and the frequency of data transfer of the particular internal unit 62. Therefore, the general versatility of the bus control device can be enhanced.

In Embodiments 1 to 7, the bus control device is realized using a single semiconductor integrated circuit. However, the present invention is not limited thereto. The bus control device may have a configuration, for example, in which the external interface, the internal units, and the memory interface are composed of different semiconductor integrated circuits, and each semiconductor integrated circuit is mounted on a substrate.

The bus control device and information processing system of the present invention is usefully applied, in particular, to a device in which an internal unit transmits/receives a large amount of data with respect to a local memory via an internal bus, such as an a video display control LSI and an audio processing LSI.

As described above, according to the bus control device and the information processing system of the present invention, the access from an external device such as a CPU can be prioritized. Therefore, it is not necessary to provide an excess memory as in the prior art, which reduces a stand-by period for access from an external device to a local memory, whereby the performance of the entire system can be enhanced.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A bus control device comprising an external interface connected to an external device via an external system bus, an internal unit, a memory interface connected to an external local memory, and an internal bus at least connecting the external interface to the memory interface and connecting the internal unit to the memory interface, wherein the memory interface comprises a bus arbiter for arbitrating between a request for use of the internal bus by the external interface and by the internal unit, and a priority processing interval managing part for monitoring a usage pattern of the internal bus based on a result of an arbitration performed by the bus arbiter, the internal unit has a function of notifying the bus arbiter of an amount of data to be transferred, as well as requesting a use of the internal bus, the priority processing interval managing part notifies the bus arbiter and the external interface that only the external interface is permitted to use the internal bus, in a case where the internal unit is not using the internal bus and sets a priority processing interval during which only the external interface is capable of using the internal bus, the bus arbiter compares a previously set amount of data with the amount of data to be transferred, in a case of receiving a request for use of the internal bus and a notification of the amount of data to be transferred from the internal unit, during the priority processing interval, when the amount of data to be transferred is equal to or less than the previously set amount of data, the bus arbiter permits the internal unit to use the internal bus during the priority processing interval, and when the amount of data to be transferred exceeds the previously set amount of data, the bus arbiter prohibits the internal unit from using the internal bus while the priority processing interval is set.

2. The bus control device according to claim 1, wherein the priority processing interval managing part monitors the usage pattern of the internal bus by confirming the result of the arbitration performed by the bus arbiter at a previously set frequency, and the frequency is set by the external device.

3. The bus control device according to claim 1, wherein the memory interface comprises a priority processing interval setting register for staring information specifying a length of the priority processing interval, and the priority processing interval managing part sets the priority processing interval based on the information stored in the priority processing interval setting register.

4. A bus control device comprising an external interface connected to an external device via an external system bus, an internal unit, a memory interface connected to an external local memory, and an internal bus at least connecting the external interface to the memory interface and connecting the internal unit to the memory interface, wherein the memory interface comprises a bus arbiter for arbitrating between a request for use of the internal bus by the external interface and by the internal unit, and a priority processing interval managing part for monitoring a usage pattern of the internal bus by confirming a result of an arbitration performed by the bus arbiter at a frequency set by the external device, the priority processing interval managing part notifies the bus arbiter and the external interface that only the external interface is permitted to use the internal bus, in a case where the internal unit is not using the internal bus and sets a priority processing interval during which only the external interface is capable of using the internal bus, the bus arbiter prohibits the internal unit from using the internal bus while the priority processing interval is set, the internal unit has a function of notifying the bus arbiter of an amount of data to be transferred, as well as requesting a use of the internal bus, the bus arbiter compares a previously set amount of data with the amount of data to be transferred, in a case of receiving a request for use of the internal bus and a notification of the amount of data to be transferred from the internal unit, during the priority processing interval, and when the amount of data to be transferred is equal to or less than the previously set amount of data, the bus arbiter permits the internal unit to use the internal bus during the priority processing interval.

5. A bus control device comprising an external interface connected to an external device via an external system bus, a plurality of internal units, a memory interface connected to an external local memory, and an internal bus connecting the external interface to the memory interface and connecting the internal units to the memory interface, wherein a part of the plurality of internal units has a function of dividing data to be transferred to the memory interface via the internal bus and transferring it, and the memory interface prohibits the internal units other than the part of the plurality of internal units from using the internal bus and permits the external interface to use the internal bus, during a period before transfer of all the divided data is completed.

6. The bus control device according to claim 5, wherein the part of the internal units has a division and transfer notifying part, the division and transfer notifying part has a function of notifying the memory interface that the divided data is being transferred, during a period before the transfer of all the divided data is completed, in a case of transferring the data after dividing it, the memory interface has a bus arbiter for arbitrating in a request for use of the internal bus by the external interface and the internal units, and the bus arbiter prohibits the other internal units from using the internal bus and permits the external interface to use the internal bus, while being notified that the divided data is being transferred.

7. The bus control device according to claim 6, wherein the external interface and the other internal units have a function of requesting a use of the internal bus with respect to the bus arbiter and notifying the bus arbiter of an amount of data to be transferred, the bus arbiter compares a previously set amount of data with the amount of data to be transferred, in a case of receiving a request for use of the internal bus and a notification of the amount of data to be transferred from one or both of the external interface and the other internal units, while being notified that the divided data is being transferred, thereby determining whether or not one or both of the external interface and the other internal units are intended to transfer an amount of data equal to or less than the previously set amount of data, and the bus arbiter permits the use of the internal bus with respect to those which are determined to be intended to transfer the amount of data equal to or less than the previously set amount of data, while being notified that the divided data is being transferred.

8. The bus control device according to claim 5, wherein the part of the internal units comprises a division number setting register for storing information specifying a division number of the data, and divides the data based on the stored information.

9. An information processing system comprising the bus control device of claim 1, a CPU connected to the external interface of the bus control device via a system bus, and a local memory connected to the memory interface of the bus control device.

10. An information processing system comprising the bus control device of claim 5, a CPU connected to the external interface of the bus control device via a system bus, and a local memory connected to the memory interface of the bus control device.

* * * * *